US007621713B2

(12) United States Patent
Pen et al.

(10) Patent No.: US 7,621,713 B2
(45) Date of Patent: Nov. 24, 2009

(54) AUTOMATIC PALLET LOADING/UNLOADING METHOD FOR RADIOACTIVE WASTE DRUMS OF NUCLEAR WASTE INSPECTION PROCEDURE

(75) Inventors: Ben-Li Pen, Longtan Shiang (TW); Gou-Hao Tsao, Longtan Shiang (TW); Tzu-Chung Yenn, Longtan Shiang (TW); Dah-Ping Wang, Longtan Shiang (TW)

(73) Assignee: Institute of Nuclear Energy Research Atomic Energy Council, Taoyuan County (TW)

( * ) Notice: Subject to any disclaimer, the term of this patent is extended or adjusted under 35 U.S.C. 154(b) by 528 days.

(21) Appl. No.: 11/505,859

(22) Filed: Aug. 18, 2006

(65) Prior Publication Data

US 2007/0197850 A1 Aug. 23, 2007

(30) Foreign Application Priority Data

Feb. 23, 2006 (TW) .............................. 95106023 A

(51) Int. Cl.
*B65G 1/18* (2006.01)

(52) U.S. Cl. ....................... 414/799; 414/788; 414/802; 414/626; 414/676; 414/274

(58) Field of Classification Search ....................... None
See application file for complete search history.

(56) References Cited

U.S. PATENT DOCUMENTS 6,315,513 B1 * 11/2001 Harukawa et al. ........... 414/286

FOREIGN PATENT DOCUMENTS

JP 05-209966 * 8/1993
JP 05-172443 * 6/2005

* cited by examiner

*Primary Examiner*—Melvin C Mayes
*Assistant Examiner*—Smita Patel
(74) *Attorney, Agent, or Firm*—WPAT, PC; Justin King

(57) ABSTRACT

An automatic pallet loading/unloading method for radioactive waste drums is disclosed, which comprises the steps of: (a) providing a conveying pallet accommodating six radioactive waste drums; (b) arranging the pallet on a specific importing carrier; (c) performing a two-dimensional fetching position adjustment upon the pallet by the importing carrier; and (d) using a grabber crane to grab and carry the radioactive waste drums in a specific order so as to apply an continuous inspection process upon each radioactive waste drum successively. In a preferred aspect, the two-dimensional fetching position adjustment uses a transverse positioning operation cooperating with a lengthwise positioning operation to successively place each radioactive waste drum in a specific position to be grabbed by the grabber crane and thus to be inspected by the inspection process. In addition, an exporting carrier with two-dimensional position adjustment ability similar to that of the importing carrier is provided for receiving those radioactive waste drums after each has completed the inspection process, whereas an empty pallet placed on the carrier is moved with respect to the two-dimensional position adjustment of the exporting carrier so as to enable the radioactive waste drums after being inspected to set on the pallet in order appropriately. By the method of the invention, an automatic inspection process for radioactive waste drums can be achieved so as to prevent operators from getting radiation damage due to the exposure in radiation environment while operating inspection.

13 Claims, 11 Drawing Sheets

AUTOMATIC PALLET LOADING/UNLOADING METHOD FOR RADIOACTIVE WASTE DRUMS OF NUCLEAR WASTE INSPECTION PROCEDURE

FIELD OF THE INVENTION

The present invention relates to an automatic pallet system for allotting radioactive waste drums, and more particularly, to an automatic pallet loading/unloading method for radioactive waste drums of a nuclear waste inspection procedure capable of selectively grabbing one radioactive waste drums form a pallet accommodating at least six radioactive waste drums for enabling the grabbed radioactive waste drums to be inspected by the nuclear waste inspection procedure and arranging the radioactive waste drum to be placed on another pallet after completing the nuclear waste inspection procedure.

BACKGROUND OF THE INVENTION

The major problem of nuclear waste is what to do with it. In fact, one of the biggest (and perhaps the single biggest) expenses of the nuclear power industry could eventually be the storage of nuclear waste. Currently, low level radioactive nuclear wastes are mostly being stored in tens of thousands of 55-gallon radioactive waste drums, which require to be stored in a specific warehouse and inspected regularly for environmental safety before they can be buried in a permanent nuclear disposal. Conventionally, in most nuclear waste warehouse, radioactive waste drums are grouped in fours to be placed on a conveying pallet and used as a storage unit. Although storing nuclear waste in radioactive waste drums can temporarily ease the concern of nuclear pollution, the physical, chemical and radioactive characteristics of each radioactive waste drum must be measured and inspected at a regular basis so as to protect the environment.

Take the radioactive waste drums inspection procedure performed in Japan for instance, as the nuclear waste storage warehouse in Japan also treats four radioactive waste drums as a storage unit while place a storage unit, i.e. four tanks, on a pallet, one pallet is transported to an inspection station to be inspected while rotating the pallet for enable the four symmetrically-arranged radioactive waste drums to be fetched by a grabber crane at will smoothly.

Following the progress of nuclear waste management, the concept of treating four radioactive waste drums as a storage unit is challenged since it is not economical in space usage. However, if more than four radioactive waste drums are placed on a pallet, the conventional method for loading/unloading radioactive waste drums to be inspected by an inspection procedure can not perform smoothly since the more-than-four radioactive waste drums can not be placed on the pallet symmetrically such that the grabber crane can not fetch each and every tanks at will simply by the rotation of the pallet. In addition, the inspection efficiency of a conventional inspection procedure is poor since at each effort of transporting a pallet to an inspection station, there are only four radioactive waste drums available to be inspected.

Therefore, it is in need of an improved pallet loading/unloading method for radioactive waste drums that is capable of carrying more than four radioactive waste drums on a pallet while enabling each tank to be inspected smoothly.

SUMMARY OF THE INVENTION

It is the primary object of the present invention to provide an automatic pallet loading/unloading method for radioactive waste drums of a nuclear waste inspection procedure, which enables a pallet to carry at least six radioactive waste drums while using the pallet as a storage unit for the nuclear waste inspection procedure so that not only the efficiency of space used for radioactive waste drum storage can be increased, but also the number of radioactive waste drum capable of being transported per unit time is increase.

It is another object of the invention to provide an automatic pallet loading/unloading method for radioactive waste drums of a nuclear waste inspection procedure, which enables a carrier carrying a pallet having a plurality of radioactive waste drums arranged thereon to perform a two-dimensional adjustment including a transverse positioning operation and a lengthwise positioning operation for enabling a grabber crane to grab and carry the radioactive waste drums in a specific order so as to apply an continuous inspection process upon each radioactive waste drum successively such that not only an automatic inspection process for radioactive waste drums can be achieved, but also operators for the inspection process is prevented from getting radiation damage due to the exposure in radiation environment while operating the inspection.

Yet, another object of the invention to provide an automatic pallet loading/unloading method for radioactive waste drums of a nuclear waste inspection procedure, which arranges an empty pallet capable of accommodating at least six radioactive waste drums at the exit of the nuclear waste inspection procedure for carrying and transporting the radioactive waste drums inspected by the nuclear waste inspection procedure to a storage space.

To achieve the above objects, the present invention provides an automatic pallet loading/unloading method for radioactive waste drums of nuclear waste inspection procedure, comprising steps of: (a) providing a conveying pallet accommodating at least six radioactive waste drums; (b) arranging the pallet on a specific importing carrier while arranging at least three parking positions in a successive order on a lengthwise side of the importing carrier; (c) enabling the importing carrier to perform a two-dimensional fetching position adjustment upon the pallet; and (d) using a grabber crane to grab and carry the radioactive waste drums in a specific order so as to apply an inspection process upon each radioactive waste drum successively.

Preferably, the two-dimensional fetching position adjustment further comprises steps of: (c1) enabling the importing carrier to perform a transverse positioning operation upon the pallet; and (c2) enabling the importing carrier to perform a lengthwise positioning operation upon the pallet. Wherein, the lengthwise positioning operation further comprises steps of: (c21) enabling the importing carrier to move the pallet following the lengthwise direction of the importing carrier; (c22) enabling the importing carrier to stop moving the pallet as soon as the pallet reaches one of the plural parking positions; and (c23) making an evaluation to determine whether a radioactive waste drums is presented at the location of the pallet corresponding to the reached parking position; if so the step (d) is initiated; otherwise, repeating the step (c21) to step (c23).

Preferably, the automatic pallet loading/unloading method for radioactive waste drums further comprises a step of: (e)

enabling the importing carrier to move the pallet to an initial location while no radioactive waste drum exists on the pallet.

Preferably, the automatic pallet loading/unloading method for radioactive waste drums further comprises steps of: (f) providing an empty conveying pallet capable of accommodating at least six radioactive waste drums to be arranged on an exporting carrier, while arranging at least three parking positions in a successive order on a lengthwise side of the exporting carrier; (g) enabling the exporting carrier to perform a placing position adjustment upon the pallet; (h) using a grabber crane to grab and carry the radioactive waste drum passing the inspection process for placing the inspected radioactive waste drum on the pallet; and (i) enabling the exporting carrier to move the pallet to a storage location while the pallet is filled with inspected radioactive waste drums. Wherein, the placing position adjustment further comprises steps of: (g1) enabling the exporting carrier to perform a transverse positioning operation upon the pallet; and (g2) enabling the exporting carrier to move the pallet following the lengthwise direction of the exporting carrier. In addition, the lengthwise positioning operation further comprises steps of: (g21) enabling the exporting carrier to move the pallet following the lengthwise direction of the exporting carrier; (g22) enabling the exporting carrier to stop moving the pallet as soon as the pallet reaches one of the plural parking positions; and (g23) making an evaluation to determine whether there is still empty space available for accommodating inspected radioactive waste drums at the location of the pallet corresponding to the reached parking position; if so the step (h) is initiated; otherwise, repeating the step (g21) to step (g23).

To achieve the above objects, the present invention provides an automatic pallet loading/unloading method for radioactive waste drums of nuclear waste inspection procedure, comprising steps of: (a') providing an empty conveying pallet capable of accommodating at least six radioactive waste drums to be arranged on an exporting carrier, while arranging at least three parking positions in a successive order on a lengthwise side of the exporting carrier; (b') enabling the exporting carrier to perform a two-dimensional placing position adjustment upon the pallet; and (c') using a grabber crane to grab and carry the radioactive waste drum passing an inspection process for placing the inspected radioactive waste drum on the pallet.

Preferably, the two-dimensional placing position adjustment further comprises steps of: (b1') enabling the exporting carrier to perform a transverse positioning operation upon the pallet; and (b2') enabling the exporting carrier to perform a lengthwise positioning operation upon the pallet. Wherein, the lengthwise positioning operation further comprises steps of: (b21') enabling the exporting carrier to move the pallet following the lengthwise direction of the exporting carrier; (b22') enabling the exporting carrier to stop moving the pallet as soon as the pallet reaches one of the plural parking positions; and (b23') making an evaluation to determine whether there is still empty space available for accommodating inspected radioactive waste drums at the location of the pallet corresponding to the reached parking position; if so the step (c') is initiated; otherwise, repeating the step (b21') to step (b23').

Preferably, the automatic pallet loading/unloading method for radioactive waste drums further comprises a step of: (d') enabling the exporting carrier to move the pallet to a storage location while the pallet is filled with inspected radioactive waste drums.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
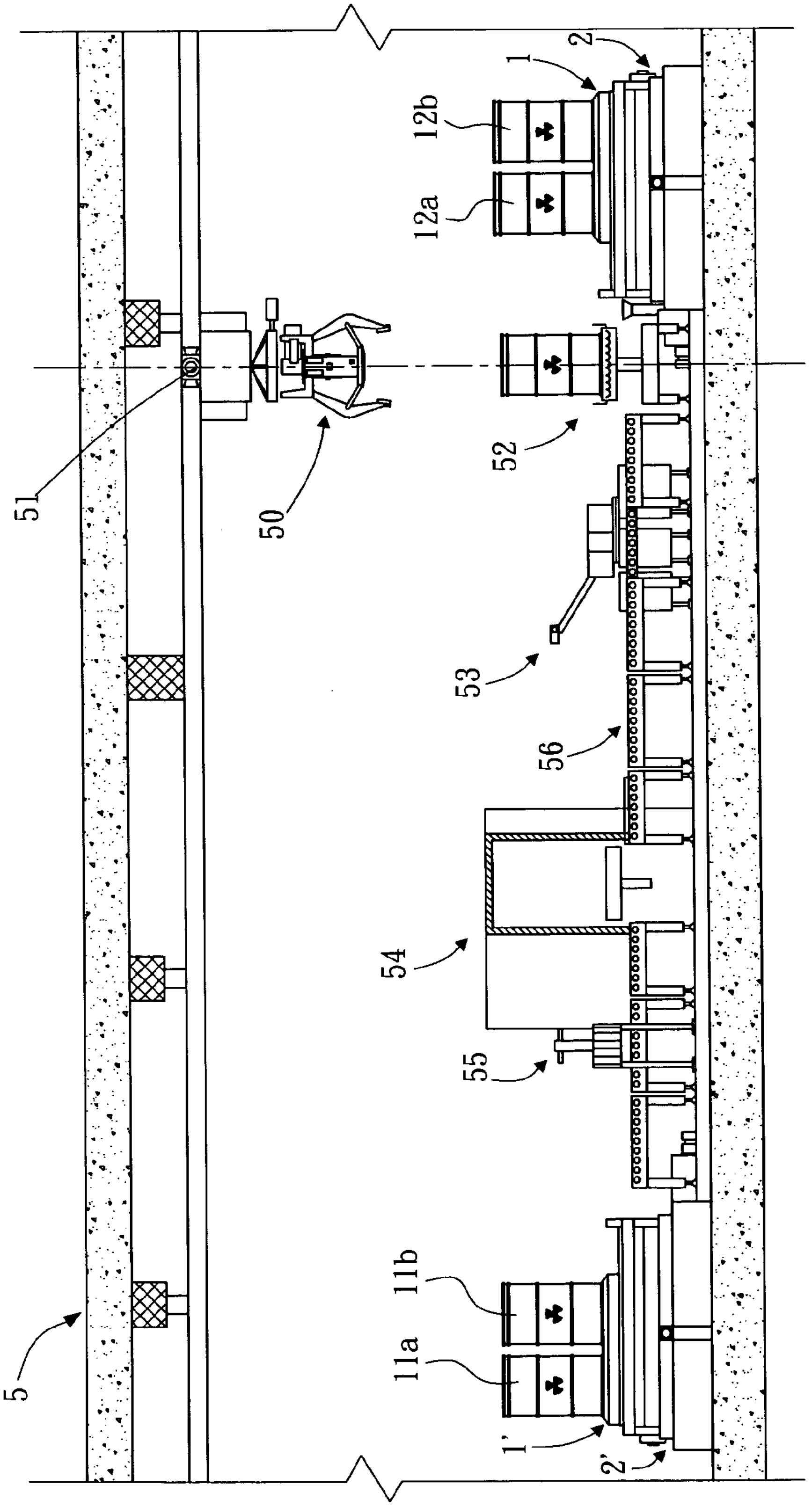
FIG. 1 is a schematic diagram showing a radioactive waste drum inspection system of the present invention.

Please refer to FIG. 1, which is a schematic diagram showing a radioactive waste drum inspection system of the present invention. The radioactive waste drum inspection system 5 includes an importing carrier 2, an exporting carrier 2', four inspection stations 52, 53, 54, 55 and a grabber crane 50. There is a pallet accommodating six radioactive waste drums, numbered as 12*a*, 12*b* for representative, arranged on importing carrier 2; and there is an empty pallet 1' arranged on the exporting carrier 2' to be used for accommodating radioactive waste drums passing the inspection process. The four inspection stations are arranged between the importing carrier 2 and the exporting carrier 2' that are respectively used for performing an appearance inspection, a surface contaminant detection, a measurement of radioactivity and nuclide, and a record marking. Nevertheless, the number of inspection station along with the inspection procedures performed therein are dependent on actual requirement, and thus are not limited by the embodiment shown in FIG. 1. The transportation between inspection stations are enabled by a conveying apparatus 56, whereas a grabber crane 50 is arranged at a trail 51 located on top of the radioactive waste drum inspection system 5 that the grabber crane is enabled to move back and forth along the trail 50 for enabling the same to fetch a radioactive waste drum located at a specific position.

Figure 2:
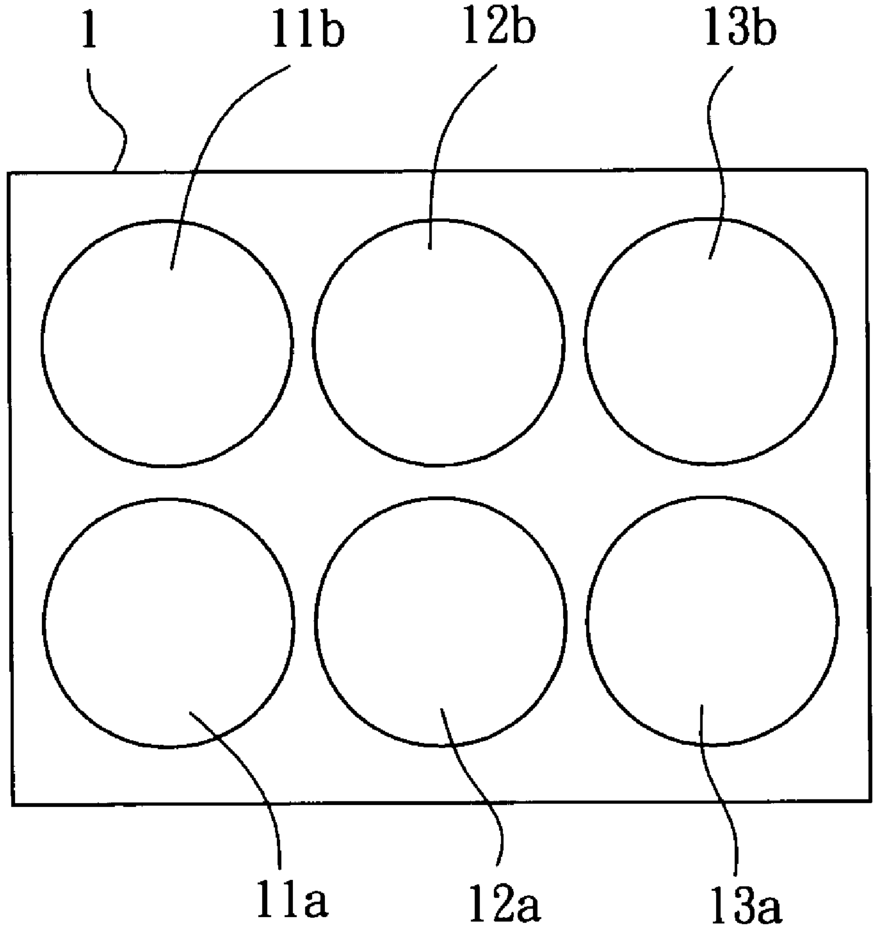
FIG. 2 is a schematic view of a pallet used for carrying radioactive waste drums according to a preferred embodiment of the present invention.

Please refer to FIG. 2, which is a schematic view of a pallet used for carrying radioactive waste drums according to a preferred embodiment of the present invention. The pallet used in the method of the present invention is a pallet capable of accommodating at least six radioactive waste drums. In the embodiment shown in FIG. 2, the pallet 1 only carries six radioactive waste drums 11*a*, 11*b*, 12*a*, 12*b*, 13*a*, 13*b*. However, the number of radioactive waste drums carried by the pallet of the present invention is not limited thereby, that it is dependent on the increasing of the space efficiency used for radioactive waste drum storage. It is noted that the radioactive waste drum used in the embodiment of FIG. 2 is a 55-gallon tank.

Figure 3:
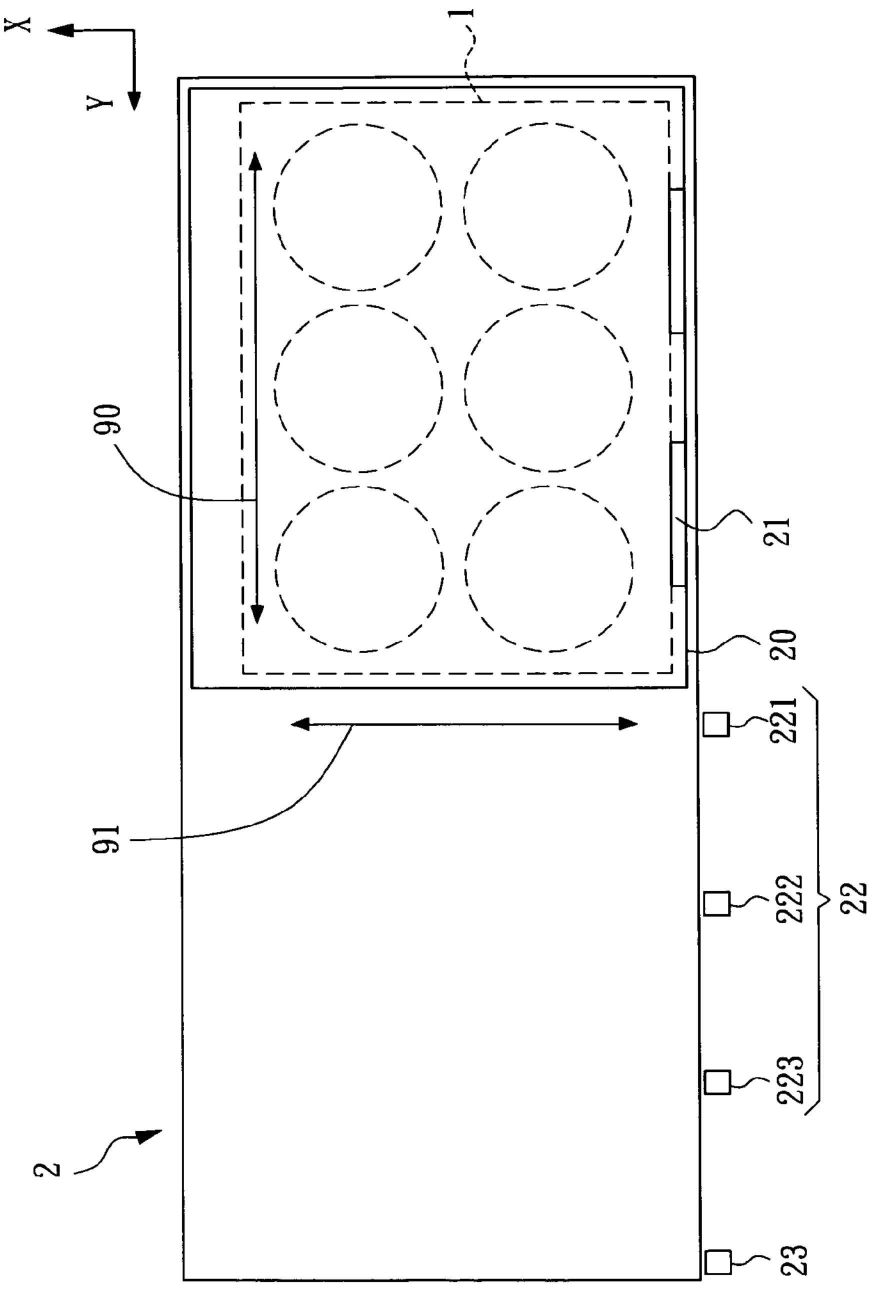
FIG. 3 is a schematic top view of an importing/exporting carrier of the present invention.

Please refer to FIG. 3, which is a schematic top view of an importing/exporting carrier of the present invention. Since the structure of the importing carrier is the same as that of the exporting carrier, only an importing carrier 2 is shown in FIG. 3 for illustration. The importing carrier is comprised of a supporting deck 20, a baffle plate 21, a boundary switch 23, and at least three position sensors 22 which are respective the first position sensor 221, the second position sensor 222 and the third position sensor 223 as shown in FIG. 3. The supporting deck 20 is used for carrying the pallet 1 accommodating six radioactive waste drums, whereas the placing of such pallet 1 on the supporting deck 20 can be varied with respect to actual requirement, such as it can be disposed on the supporting deck 20 manually or by automatic guided vehicle. Moreover, the supporting deck 20 is capable of enabling the pallet 1 to move in the lengthwise direction of the supporting deck 20 represented by the Y coordinate of FIG. 3, i.e. along the arrow 90, and to move transversely along the X coordinate of FIG. 3, i.e. along the arrow 91. That is, the supporting deck 20 is equipped with a transportation device for moving the pallet 1 transversely to abut against the baffle plate 21 for positioning the pallet 1 at a specific position on the X coordinate of the same.

Furthermore, the transportation device also can drive the pallet 1 to move following the Y coordinate of the support deck 20 for positioning the pallet 1 at specific positions in the lengthwise direction, whereas the specific positions are respectively defined by the locations of position sensors 22, that is, the moving of the pallet 1 is stopped as soon as any one of the sensors 22 is trigger by the pallet 1. As the lengthwise moving of the pallet 1 is stopped, the grabber crane 50 is activated to fetch a radioactive waste drum arranged at a position corresponding to the triggered sensor 22 while placing the grabbed radioactive waste drum on the conveying apparatus 56 to be send to those inspection stations for inspection, as shown in FIG. 1. After the radioactive waste drum finishes all the inspection operation specified in the inspection process of FIG. 1, the grabber crane 50 is once again being activated to fetch the inspected radioactive waste drum and place the same on the empty pallet 1' of the exporting carrier 2'. In the preferred embodiment shown in FIG. 3, the position sensor can be a limit switch or any other sensor capable of detection the position of the pallet; and the number of the sensors arranged on the importing/exporting carrier is correspondence to the amount of radioactive waste drums capable of being accommodated by the pallet 1. As the pallet capable of accommodating six radioactive waste drums shown in FIG. 2 that it is considered to have three pairs of radioactive waste drums arranged along the lengthwise direction of the pallet, i.e. the Y coordinate, it is therefore required to have three position sensors to be arranged along the lengthwise direction of the importing/exporting carrier. Similarly, if there are four pairs, then four sensors are required, and so forth. The boundary switch 23 is acted as a safety prevention device for preventing the malfunction of the supporting deck 20.

Figure 4A:
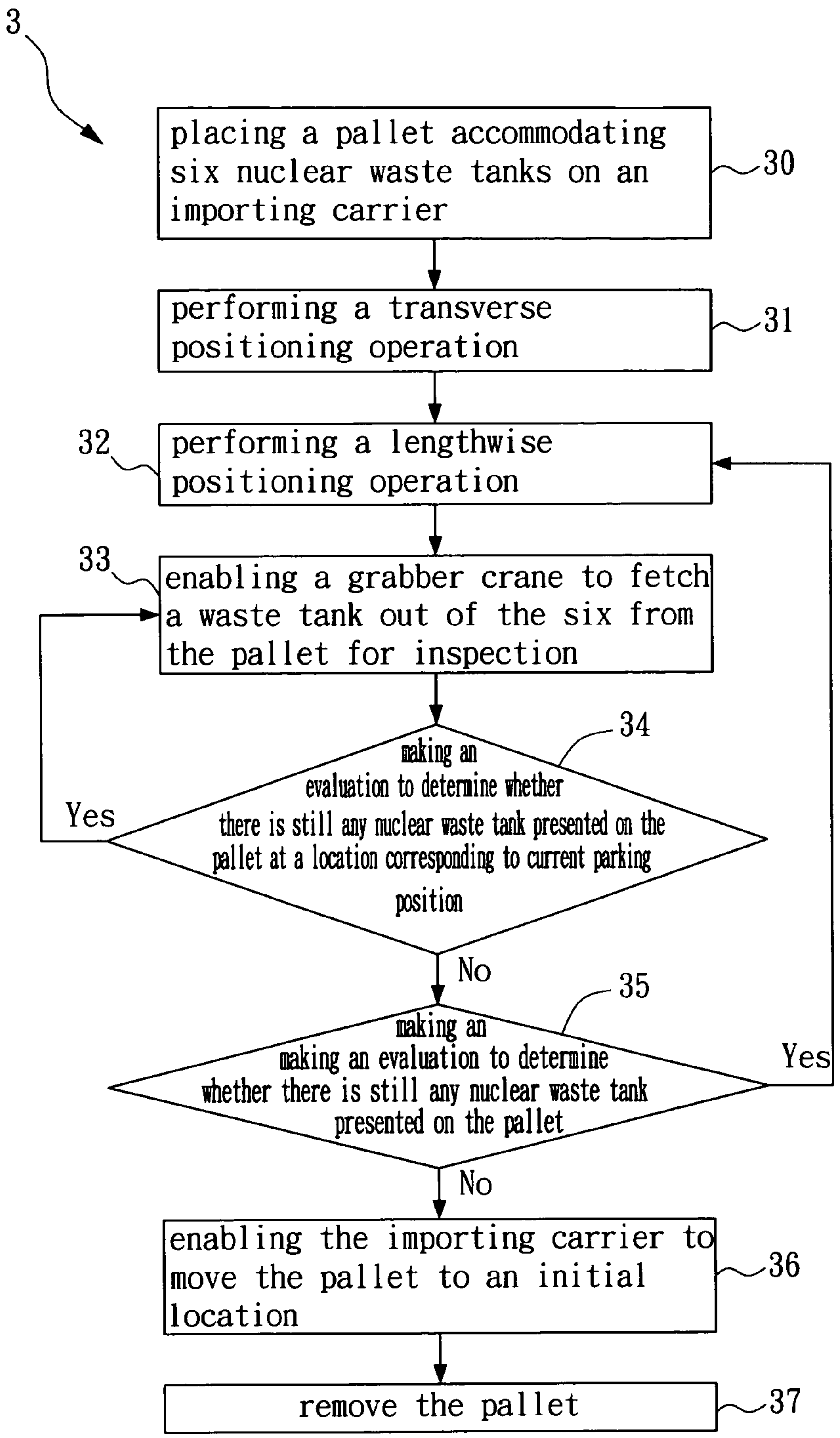
FIG. 4A is a flow chart depicting steps of a nuclear waste inspection procedure according to the present invention.

Please refer to FIG. 4A, which is a flow chart depicting steps of a nuclear waste inspection procedure according to the present invention. The inspection starts at step 30. In step 30, a pallet accommodating six radioactive waste drums is placed on the supporting deck of an importing carrier, whereas the placing of the pallet can be performed manually or by an automatic guided vehicle in an automatic manner, and then the flow proceeds to step 31. In step 31, the supporting deck drives the pallet to move transversely to abut against the baffle plate for positioning the pallet at a specific position on the X coordinate of the same, and then the flow proceeds to step 32. In step 32, the supporting deck drives the pallet to move following the Y coordinate of the support deck for positioning the pallet at specific positions in the lengthwise direction, and then the flow proceeds to step 33. In addition, detailed description of step 32 is provided hereinafter.

As soon as the step 32 is complete, the radioactive waste drum to be inspected is positioned at a location suitable to be fetch by the grabber crane for inspection. In step 33, a grabber crane is activated to fetch a radioactive waste drum out of the six from the pallet for inspection, and the flow proceeds to step 34. As the fetched radioactive waste drum is being sent for inspection, the inspection can be divided into four stages according to a preferred embodiment as shown in FIG. 4C, which are the first stage 331, where an appearance inspection is performed upon the fetched radioactive waste drum; the second stage 332, where a surface contaminant detection is performed upon the fetched radioactive waste drum; the thirds stage 333, where the radioactivity and the nuclide of the fetched radioactive waste drum is measured; and the fourth stage 334, the result relating to the above inspection is marked on the fetched radioactive waste drum. In this preferred embodiment, the four stages are connected using a conveying apparatus for transporting the fetched radioactive waste drum smoothly from one stage to another.

In step 34, an evaluation is being made to determine whether there is still any radioactive waste drum presented on the pallet at a location corresponding to current parking position while the fetched radioactive waste drum is being inspected; if so, then the flow goes back to step 33; otherwise, the flow proceeds to step 35. In step 35, an evaluation is being made to determine whether there is still any radioactive waste drum presented on the pallet; if so, then the flow goes back to step 32 for enabling the pallet to move along the lengthwise direction until it trigger next position sensor; otherwise, the flow proceeds to step 36 as the last position sensor had already been trigger and all the radioactive waste drums arranged on the pallet had already been fetched. In step 36, the supporting deck of the importing carrier drives the pallet to move back to an initial location, and then the flow proceeds to step 37. In step 37, the pallet is removed from the supporting deck for making the same available to next pallet accommodating six radioactive waste drums.

Figure 4B:
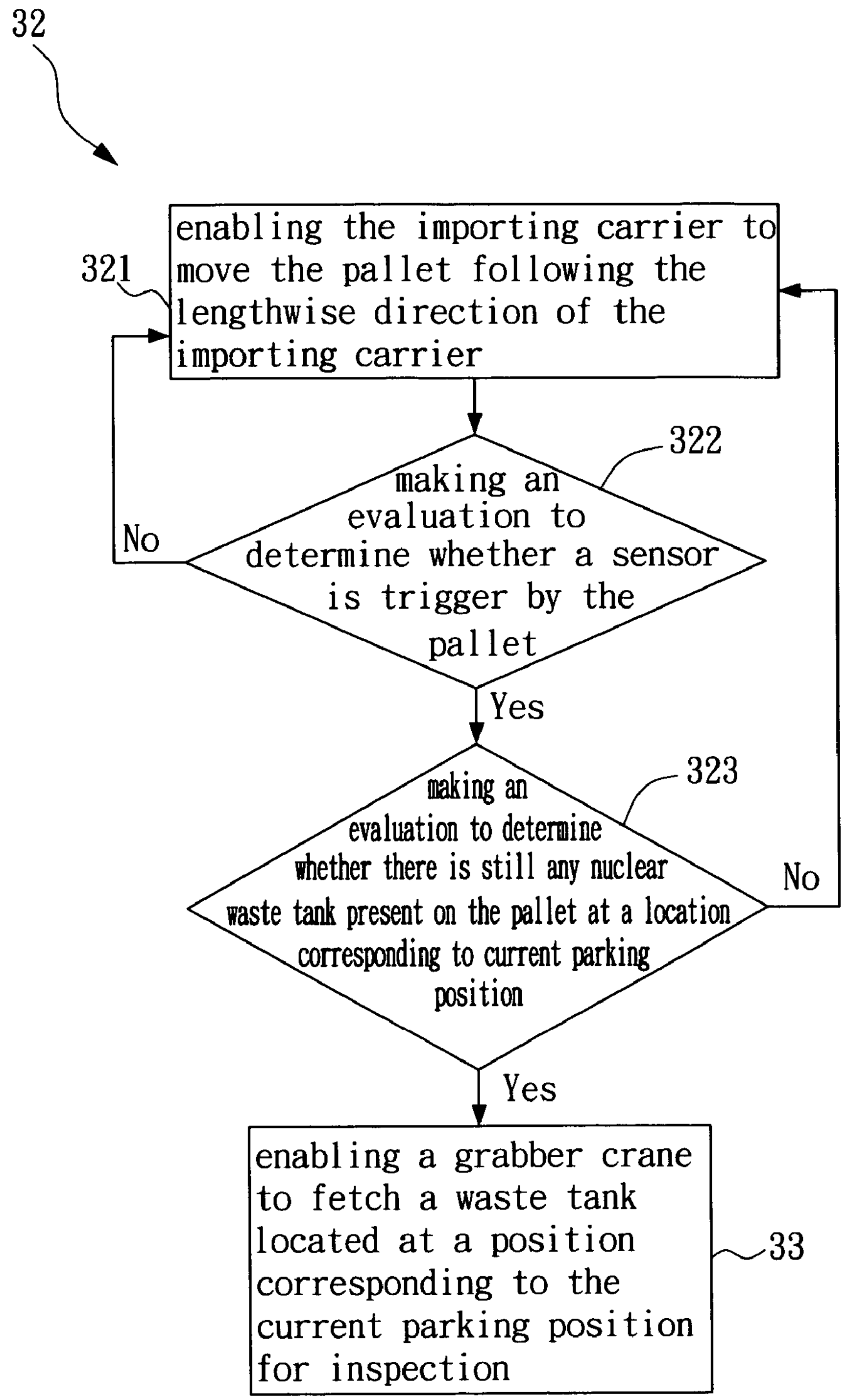
FIG. 4B is a flow chart depicting steps of positioning a pallet accommodating six radioactive waste drums on an importing carrier according to a preferred embodiment of the invention.
Figure 4C:
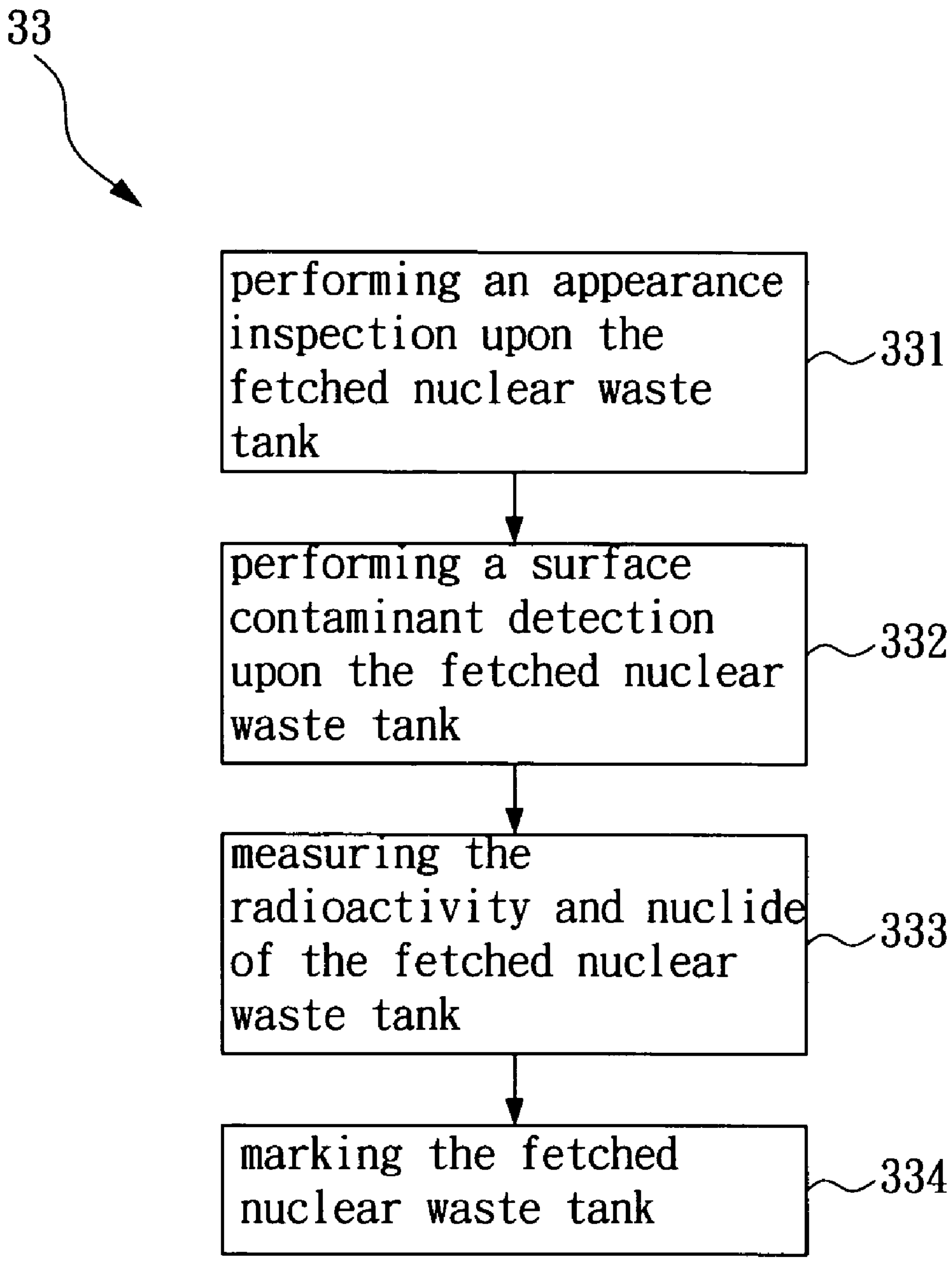
FIG. 4C is a flow chart depicting steps of inspecting a radioactive waste drum.
Figure 6A:
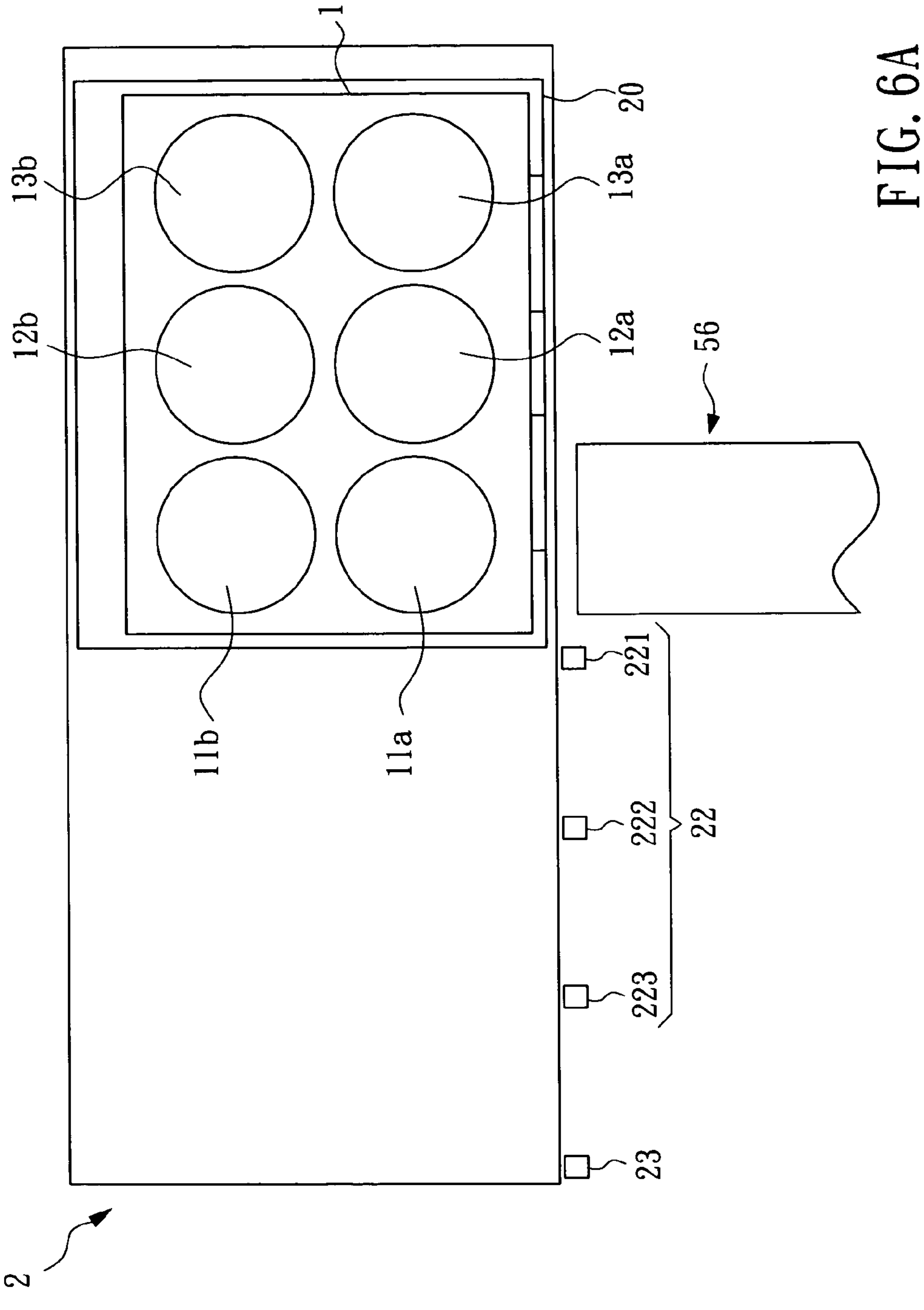
FIG. 6A~FIG. 6C shows the progressing of the removal of radioactive waste drums from a pallet of the present invention.

The detailed description of the lengthwise positioning adjustment of the step 32 of FIG. 4A is disclosed in the steps shown in FIG. 4B with reference to the arrangement shown in FIG. 3. As seen in FIG. 3, there are three position sensors, i.e. a first position sensor 221, a second position sensor 222 and a third position sensor, respectively being arranged at three parking position in a successive order on a lengthwise side of the importing carrier 2. The lengthwise positioning adjustment of the pallet on the supporting deck starts at step 321. In step 321, the support deck drives the pallet to move following the Y coordinate of the support deck, i.e. to perform a lengthwise positioning operation 90, and then the flow proceeds to step 322. In step 322, an evaluation is being made to determine whether the first sensor 221 is trigger by the pallet as the moving of the pallet; if so, then the moving of the pallet is stopped and then the flow proceeds to step 323. It is noted that as the pallet is stopped as the first position 221 is triggered, the positioning of the pallet is just at a location suitable for the grabber crane to fetch the radioactive waste drums 11*a*, 11*b* as shown in FIG. 6A. In step 323, an evaluation is being made to determine whether there is still any radioactive waste drum present on the pallet at a location corresponding to current parking position, i.e. the location of the first position sensor 221; if so, the flow proceeds to the step 33 for enabling a grabber crane to fetch a radioactive waste drum located at a position corresponding to the current parking position for inspection.

Figure 6B:
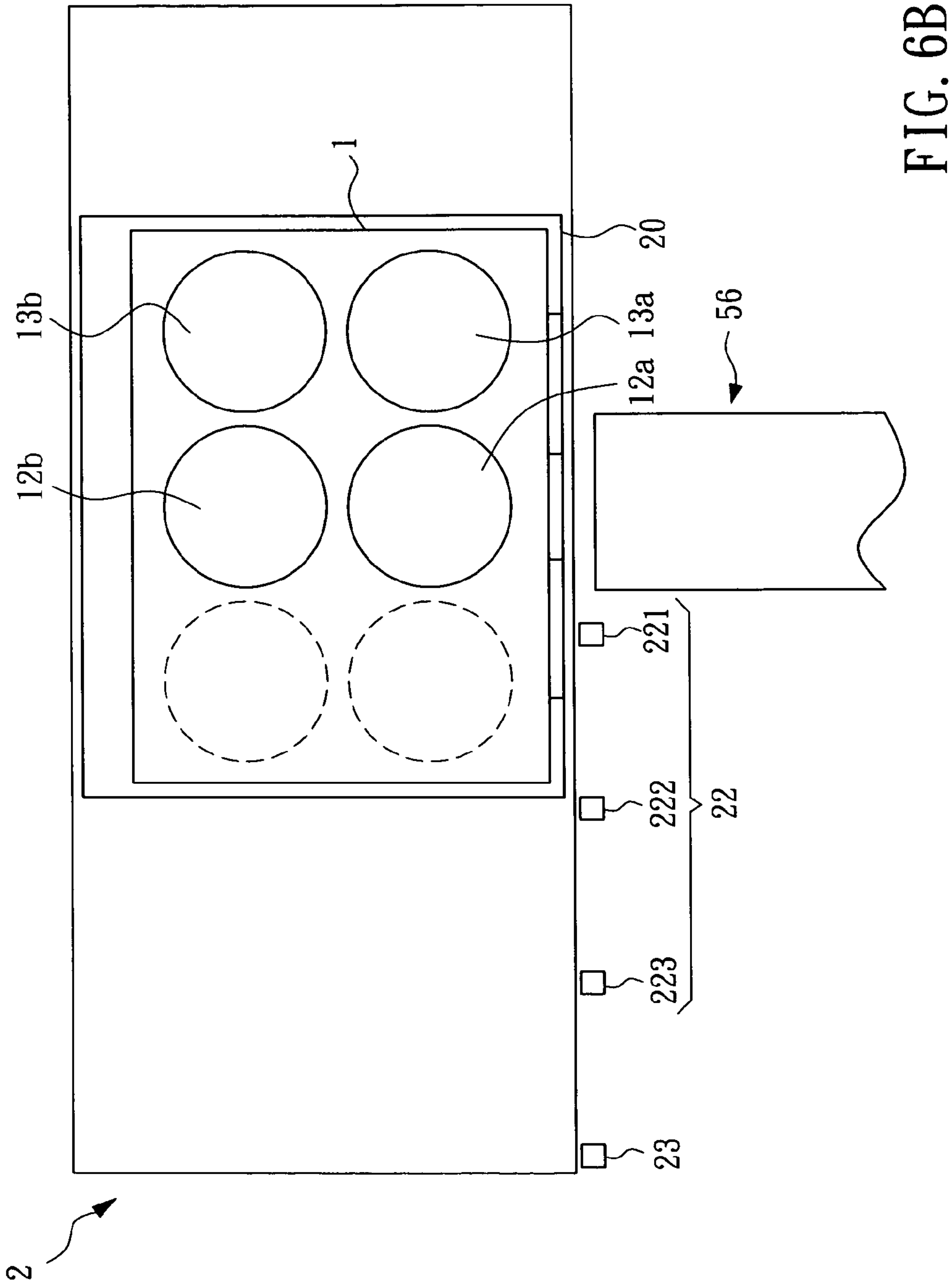

In step 323, if there is no radioactive waste drum present on the pallet at a location corresponding to current parking position, i.e. the location of the first position sensor 221, there are still four radioactive waste drums presented on the pallet, the flow will go back to repeat the step 32 for driving the pallet to move again until the second position 222 is triggered. As the pallet is stopped at a location when the second position sensor 222 is triggered, the positioning of the pallet is just at a location suitable for the grabber crane to fetch the radioactive waste drums 12*a*, 12*b* as shown in FIG. 6B. Therefore, as the progressing of the flow depicted in FIG. 4B, the steps 33, 34, 35 are proceeded thereafter.

Figure 6C:
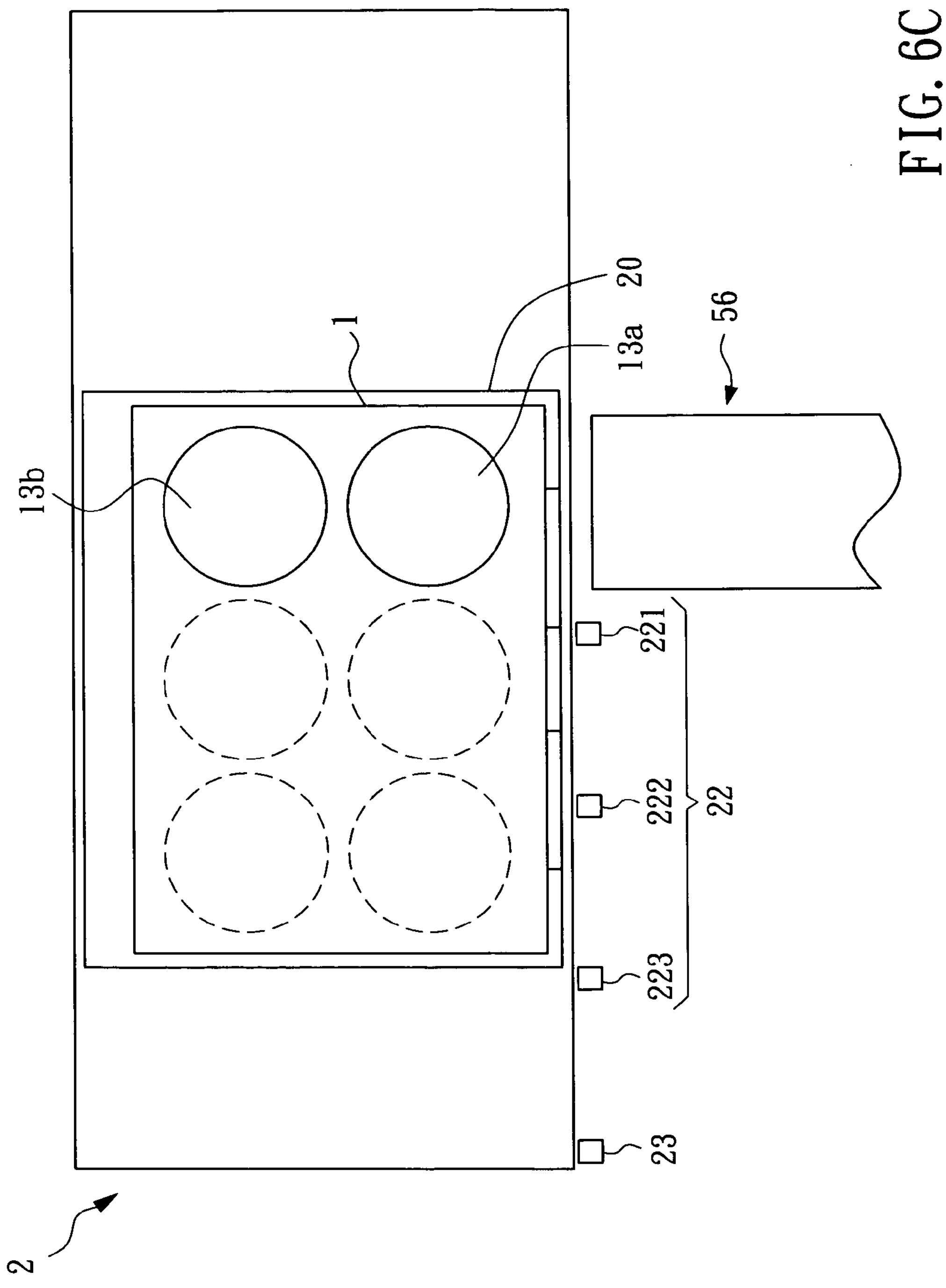

Similarly, as there is no radioactive waste drum present on the pallet at a location corresponding to current parking position, i.e. the location of the second position sensor 222, the flow will go back to repeat the step 32 for driving the pallet to move again until the third position 223 is triggered. As the pallet is stopped at a location when the third position sensor 223 is triggered, the positioning of the pallet is just at a location suitable for the grabber crane to fetch the radioactive waste drums 13*a*, 13*b* as shown in FIG. 6C. Thereafter, the flow will proceed similarly as above description that is not described further herein.

Figure 5A:
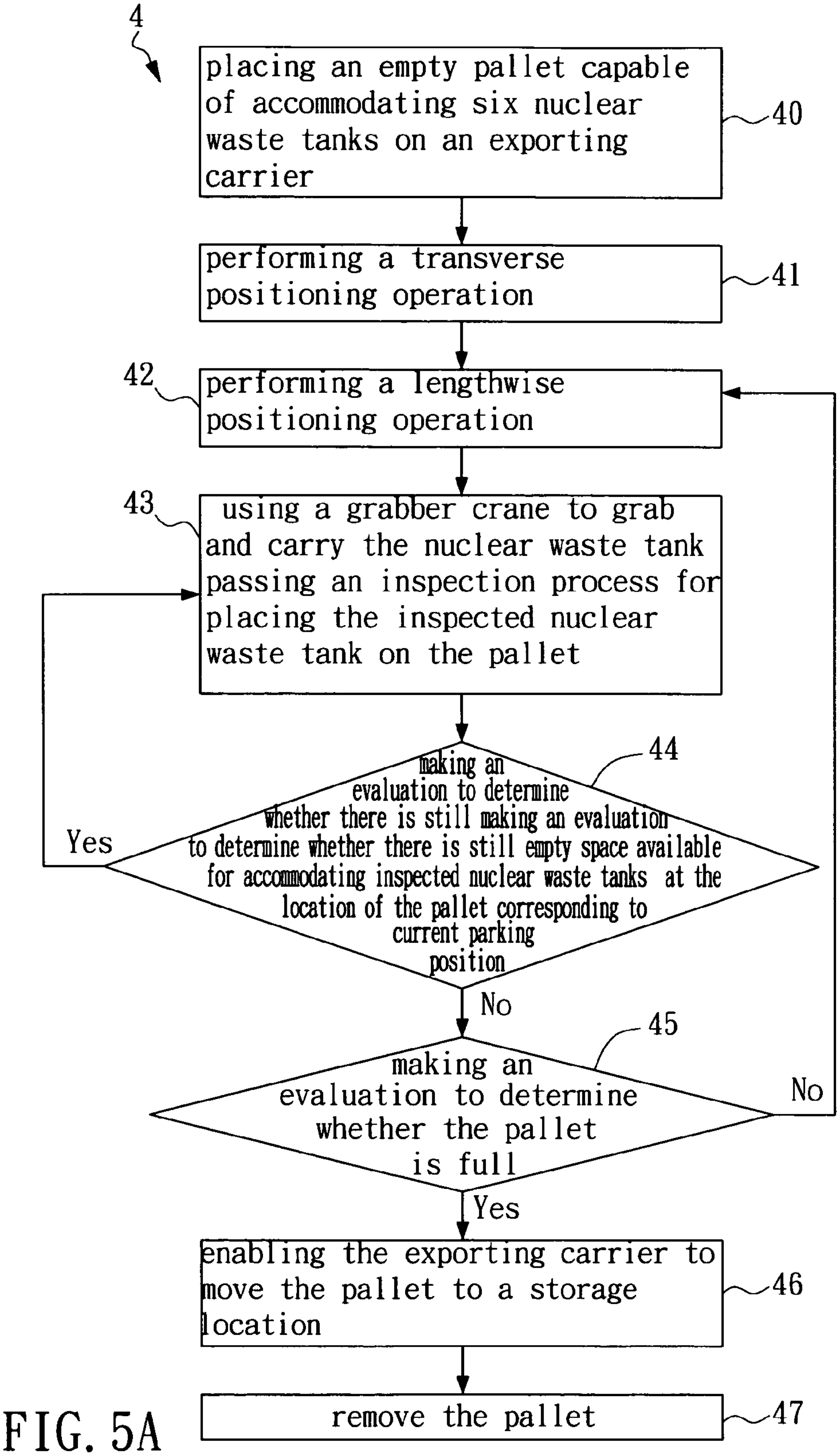
FIG. 5A is a flow chart depicting steps of using an exporting carrier carrying a pallet capable of accommodating six radioactive waste drums to transport the radioactive waste drums being inspected by an inspection procedure back to a storage location according to the present invention.
Figure 5B:
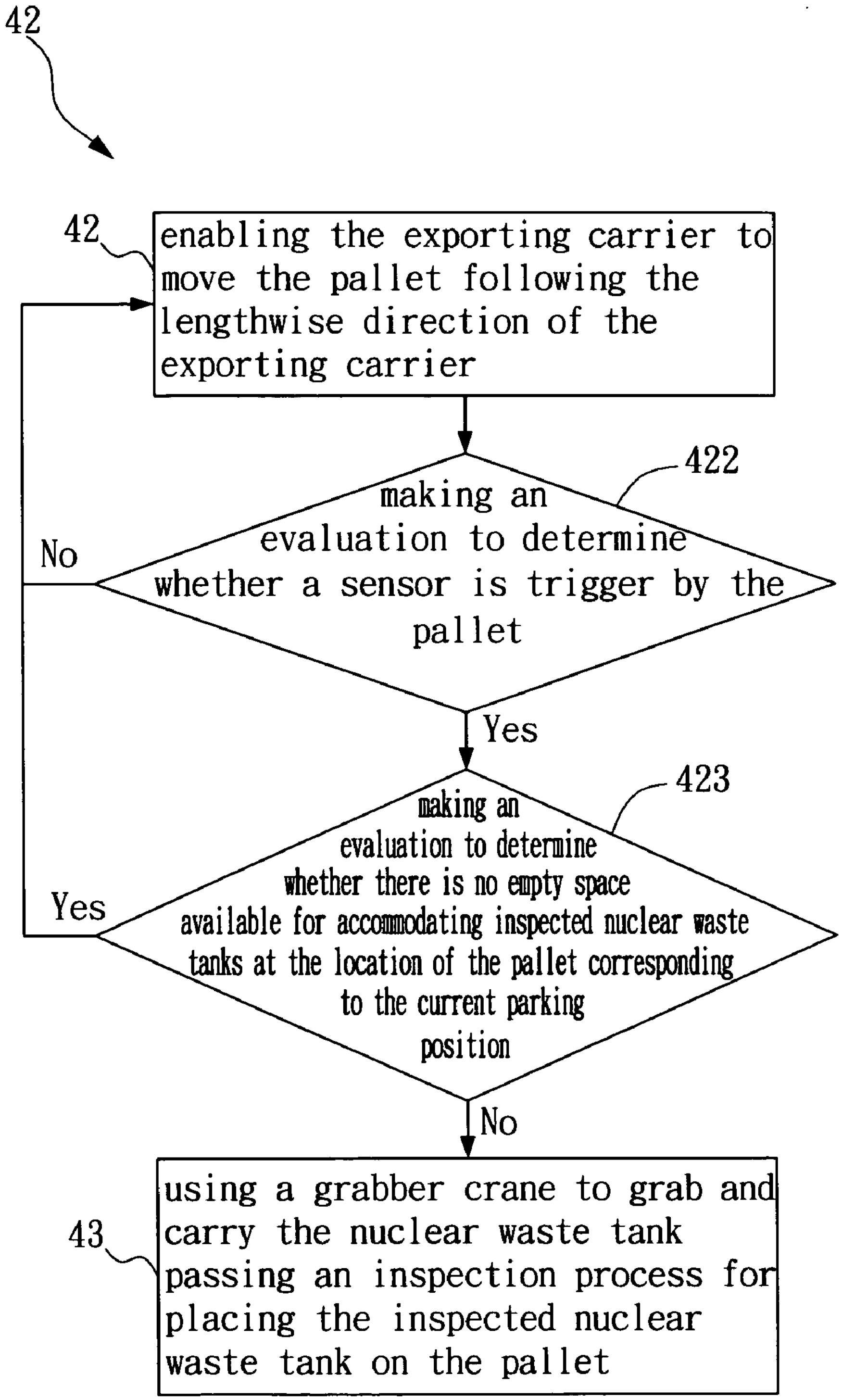
FIG. 5B is a flow chart depicting steps of positioning a pallet capable of accommodating six radioactive waste drums on an exporting carrier according to a preferred embodiment of the invention.

Please refer to FIG. 5A, which is a flow chart depicting steps of using an exporting carrier carrying a pallet capable of accommodating six radioactive waste drums to transport the radioactive waste drums being inspected by an inspection procedure back to a storage location according to the present invention. As the step 30 of FIG. 4A id progressing, the step 40 of FIG. 5A is also initiated. In step 40, an empty pallet is capable of accommodating six radioactive waste drums is placed on an exporting carrier, and then the flow proceeds to step 41. In step 41, the supporting deck drives the pallet to move transversely, and then the flow proceeds to step 42. In step 42, the supporting deck drives the pallet to move following the lengthwise direction of the exporting carrier for positioning the pallet at specific positions similar to those shown in step 32 of FIG. 4A, and then the flow proceeds to step 43. The detailed description of the lengthwise positioning adjustment is revealed in steps shown in FIG. 5B, which is similar to those of FIG. 4B.

As soon as the step 42 is complete, the empty pallet is located at a position suitable to receive the inspected radioactive waste drums, so that step 43 can be proceeded. In step 43, a grabber crane grabs and carries a radioactive waste drum passing an inspection process for placing the inspected radioactive waste drum on the pallet, and the flow proceeds to step 44. In step 44, an evaluation is being made to determine whether there is still any space pace available on the pallet at the location corresponding to the current parking position for receiving inspected radioactive waste drums; if so, the flow goes back to step 43; otherwise, the flow proceeds to step 45. In step 45, an evaluation is made to determine whether the pallet is full; if so, the flow proceeds to step 46; otherwise, the flow goes back to step 42 for driving the pallet is move until the next positioning sensor is trigger and then the flow proceeds. In step 46, the exporting carrier is enabled to move the pallet to a storage location, and then the flow proceeds to step 47. In step 47, the pallet is removed from the exporting carrier.

It is noted that the sizes of the importing carrier and the exporting carrier can be adjusted with respect to the size of the pallet. In the pallet disclosed in the preferred embodiment shown in FIG. 2, the pallet is able to accommodate six radioactive waste drums by arranging two tanks parallelly at locations respectively corresponding to each parking positions while arranging three parking positions in a successive order on a lengthwise side of the importing/exporting carrier. In another word, if the pallet used in the present invention is able to accommodate eight radioactive waste drums while also arranging two tanks two tanks parallelly at locations respectively corresponding to each parking positions, there will be four parking positions arranged on a lengthwise side of the importing/exporting carrier. As description disclosed above, the present invention is able to use a pallet capable of accommodating at least six radioactive waste drums, so that not only the efficiency of space used for radioactive waste drum storage can be increased, but also the number of radioactive waste drum capable of being transported per unit time is increase.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An automatic pallet loading/unloading method for radioactive waste drums of nuclear waste inspection procedure, comprising steps of:

(a) providing a conveying pallet accommodating at least six radioactive waste drums;

(b) arranging the pallet on a specific importing carrier while arranging at least three parking positions in a successive order on a lengthwise side of the importing carrier;

(c) utilizing a supporting deck equipped with a transportation device to drive the pallet thereon enabling the importing carrier to perform a two-dimensional fetching position adjustment upon the pallet; and (d) using a grabber crane to grab and carry the radioactive waste drums in a specific order so as to apply an inspection process upon each radioactive waste drum successively.

2. The method of claim 1, wherein the two-dimensional fetching position adjustment further comprises steps of:

(c1) enabling the importing carrier to perform a transverse positioning operation upon the pallet; and (c2) enabling the importing carrier to perform a lengthwise positioning operation upon the pallet.

3. The method of claim 2, wherein the lengthwise positioning operation further comprises steps of:

(c21) enabling the importing carrier to move the pallet following the lengthwise direction of the importing carrier;

(c22) enabling the importing carrier to stop moving the pallet as soon as the pallet reaches one of the plural parking positions; and (c23) making an evaluation to determine whether there is still any radioactive waste drums presented at the location of the pallet corresponding to the reached parking position; if so the step (d) is initiated; otherwise, repeating the step (c21) to step (c23).

4. The method of claim 1, further comprising a step of:

(e) enabling the importing carrier to move the pallet to an initial location while no radioactive waste drum exists on the pallet.

5. The method of claim 1, wherein the inspection process further comprises steps of:

(d1) performing an appearance inspection upon the fetched radioactive waste drum;

(d2) performing a surface contaminant detection upon the fetched radioactive waste drum;

(d3) measuring the radioactivity and nuclide of the fetched radioactive waste drum; and (d4) marking the fetched radioactive waste drum.

6. The method of claim 1, further comprising steps of:

(f) providing an empty conveying pallet capable of accommodating at least six radioactive waste drums to be arranged on an exporting carrier, while arranging at least three parking positions in a successive order on a lengthwise side of the exporting carrier; (g) enabling the exporting carrier to perform a placing position adjustment upon the pallet; and (h) using a grabber crane to grab and carry the radioactive waste drum passing the inspection process for placing the inspected radioactive waste drum on the pallet.

7. The method of claim 6, wherein the placing position adjustment further comprises steps of:

(g1) enabling the exporting carrier to perform a transverse positioning operation upon the pallet; and (g2) enabling the exporting carrier to move the pallet following the lengthwise direction of the exporting carrier.

8. The method of claim 7, wherein the lengthwise positioning operation further comprises steps of:

(g21) enabling the exporting carrier to move the pallet following the lengthwise direction of the exporting carrier;

(g22) enabling the exporting carrier to stop moving the pallet as soon as the pallet reaches one of the plural parking positions; and (g23) making an evaluation to determine whether there is still empty space available for accommodating inspected radioactive waste drums at the location of the pallet corresponding to the reached parking position; if so the step (h) is initiated; otherwise, repeating the step (g21) to step (g23).

9. The method of claim 6, further comprising a step of:

(i) enabling the exporting carrier to move the pallet to a storage location while the pallet is filled with inspected radioactive waste drums.

10. An automatic pallet loading/unloading method for radioactive waste drums of nuclear waste inspection procedure, comprising steps of:

(a') providing an empty conveying pallet capable of accommodating at least six radioactive waste drums to be arranged on an exporting carrier, while arranging at least three parking positions in a successive order on a lengthwise side of the exporting carrier;

(b') utilizing a supporting deck equipped with a transportation device to drive the pallet thereon enabling the exporting carrier to perform a two-dimensional placing position adjustment upon the pallet; and (c') using a grabber crane to grab and carry the radioactive waste drum passing an inspection process for placing the inspected radioactive waste drum on the pallet.

11. The method of claim 10, wherein the two-dimensional placing position adjustment further comprises steps of:

(b1') enabling the exporting carrier to perform a transverse positioning operation upon the pallet; and (b2') enabling the exporting carrier to perform a lengthwise positioning operation upon the pallet.

12. The method of claim 11, wherein the lengthwise positioning operation further comprises steps of:

(b21') enabling the exporting carrier to move the pallet following the lengthwise direction of the exporting carrier;

(b22') enabling the exporting carrier to stop moving the pallet as soon as the pallet reaches one of the plural parking positions; and (b23') making an evaluation to determine whether there is still empty space available for accommodating inspected radioactive waste drums at the location of the pallet corresponding to the reached parking position; if so the step (c') is initiated; otherwise, repeating the step (b21') to step (b23').

13. The method of claim 10, further comprising a step of:

(d') enabling the exporting carrier to move the pallet to a storage location while the pallet is filled with inspected radioactive waste drums.

* * * * *